United States Patent [19]
Hansen

[11] 3,733,103
[45] May 15, 1973

[54] MOUNTING OF PROTECTIVE BARS ON MAIN FRAME

[75] Inventor: Kenneth N. Hansen, Waukesha, Wis.

[73] Assignee: Allis-Chalmers Manufacturing Company, Milwaukee, Wis.

[22] Filed: May 18, 1971

[21] Appl. No.: 144,419

[52] U.S. Cl. ............................296/35 R, 280/150 C
[51] Int. Cl. .............................................B62d 27/04
[58] Field of Search ...........................296/35 R, 102; 280/150 C

[56] References Cited

UNITED STATES PATENTS

| | | |
|---|---|---|
| 3,450,430 | 6/1969 | Wendt et al. .....................280/150 C |
| 2,138,114 | 11/1938 | Nelson..............................296/35 R |
| 2,715,041 | 8/1955 | Fierbaugh et al...................296/35 R |
| 2,708,133 | 5/1955 | Sewelin et al......................296/35 R |
| 3,097,879 | 7/1963 | Looper............................296/35 R |

*Primary Examiner*—Leo Friaglia
*Assistant Examiner*—John A. Pekar
*Attorney*—Arthur L. Nelson, Kenneth C. McKivett and Robert B. Benson

[57] ABSTRACT

A means of mounting protective bars on a chassis resiliently supported by a suspension system on the vehicle main frame and a lost motion device which permits limited movement between the protective bars and the main frame until the protective bars firmly engage the main frame to provide a protective device in event of vehicle upset.

12 Claims, 6 Drawing Figures

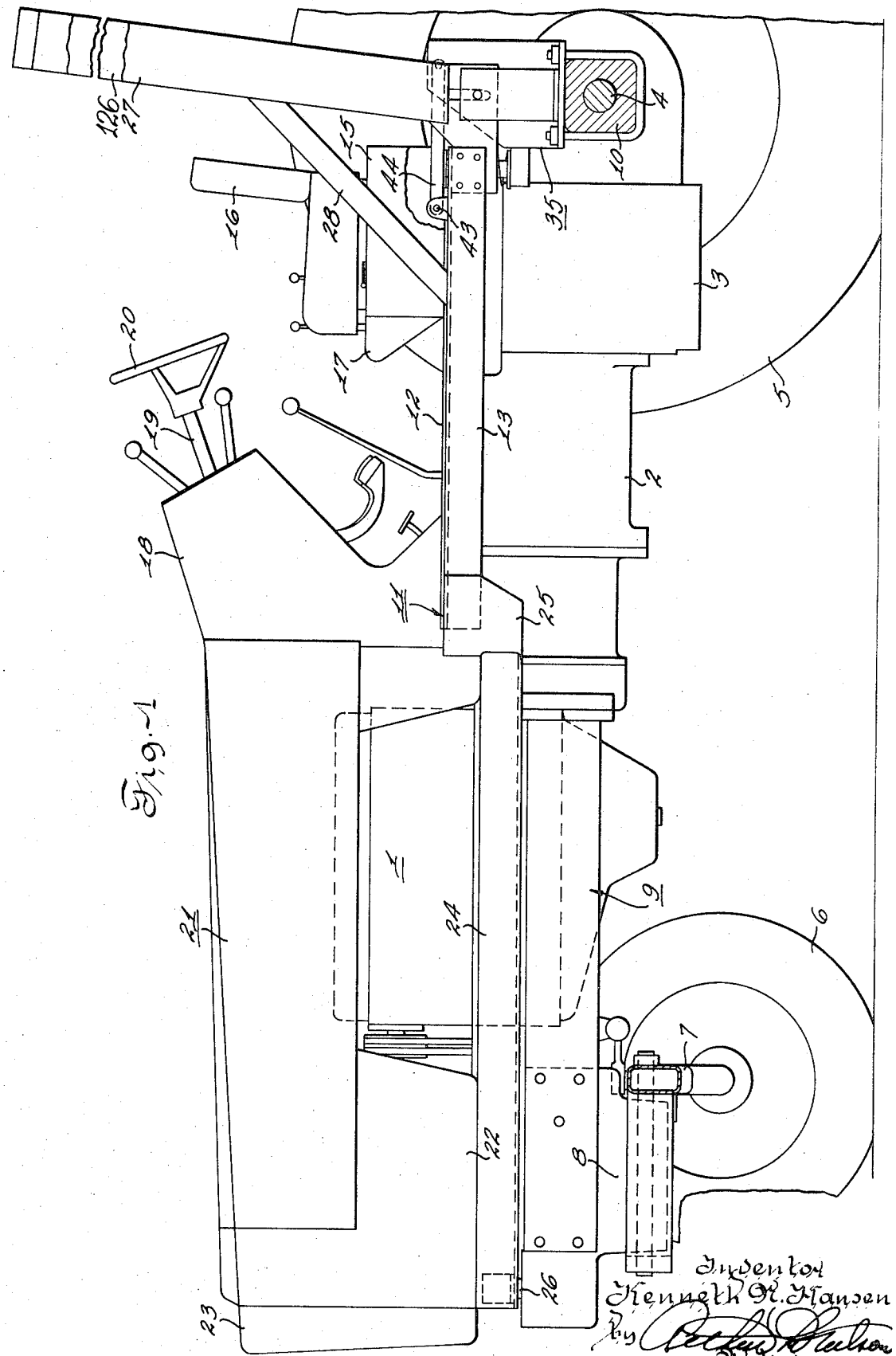

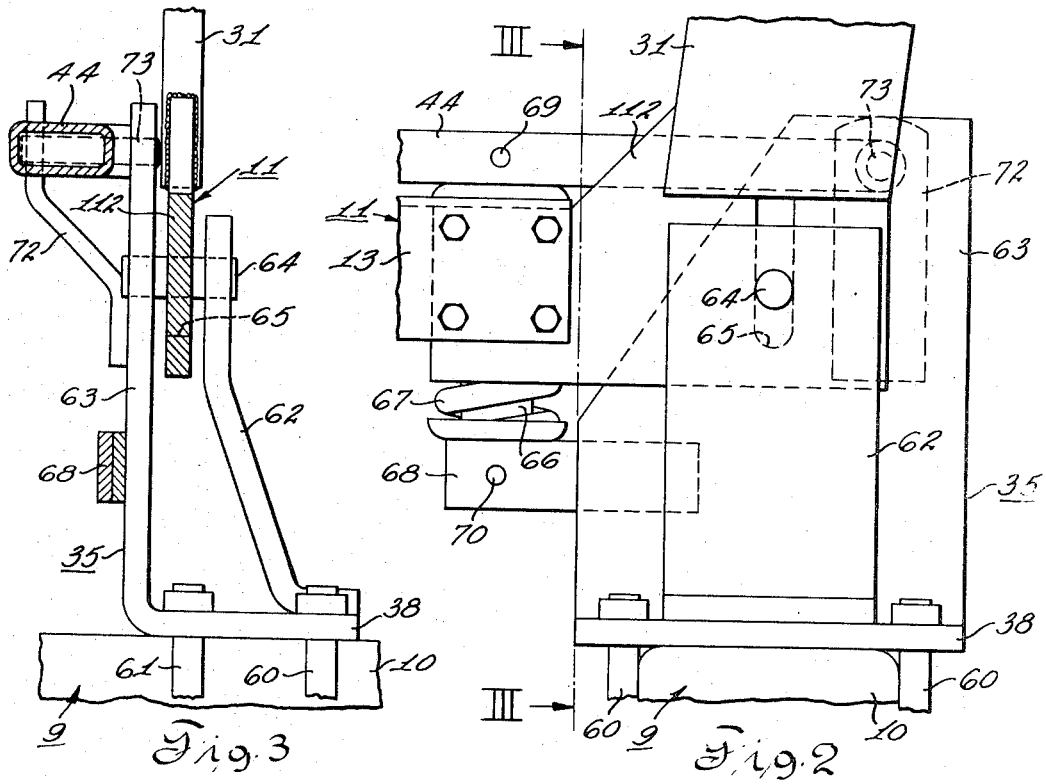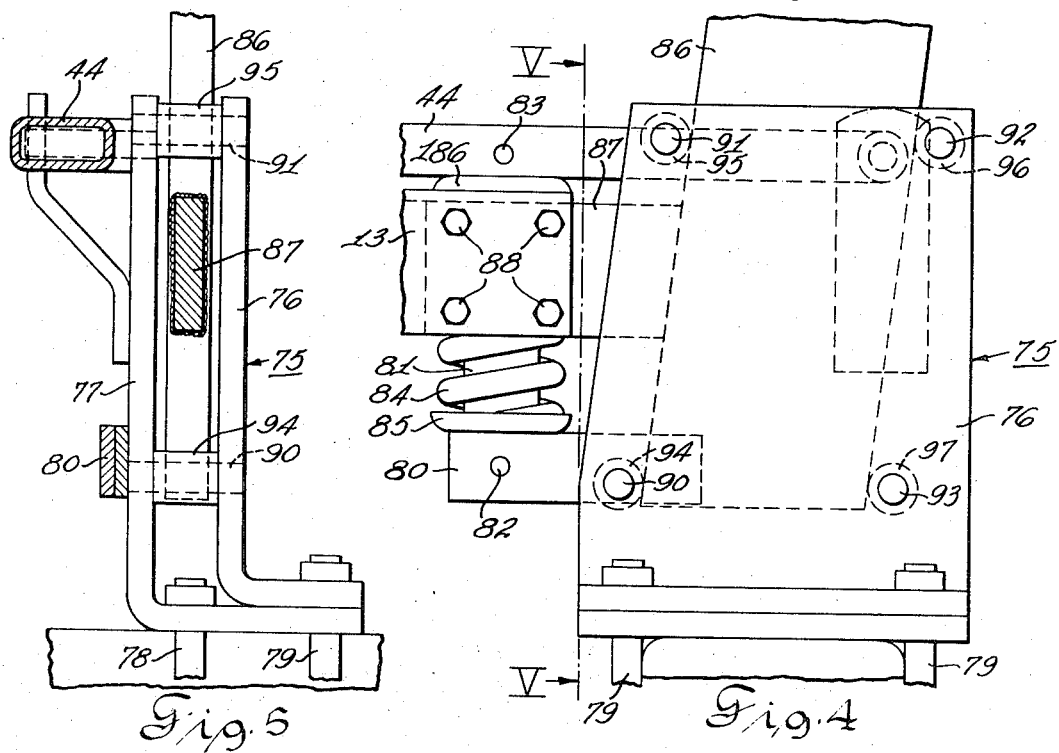

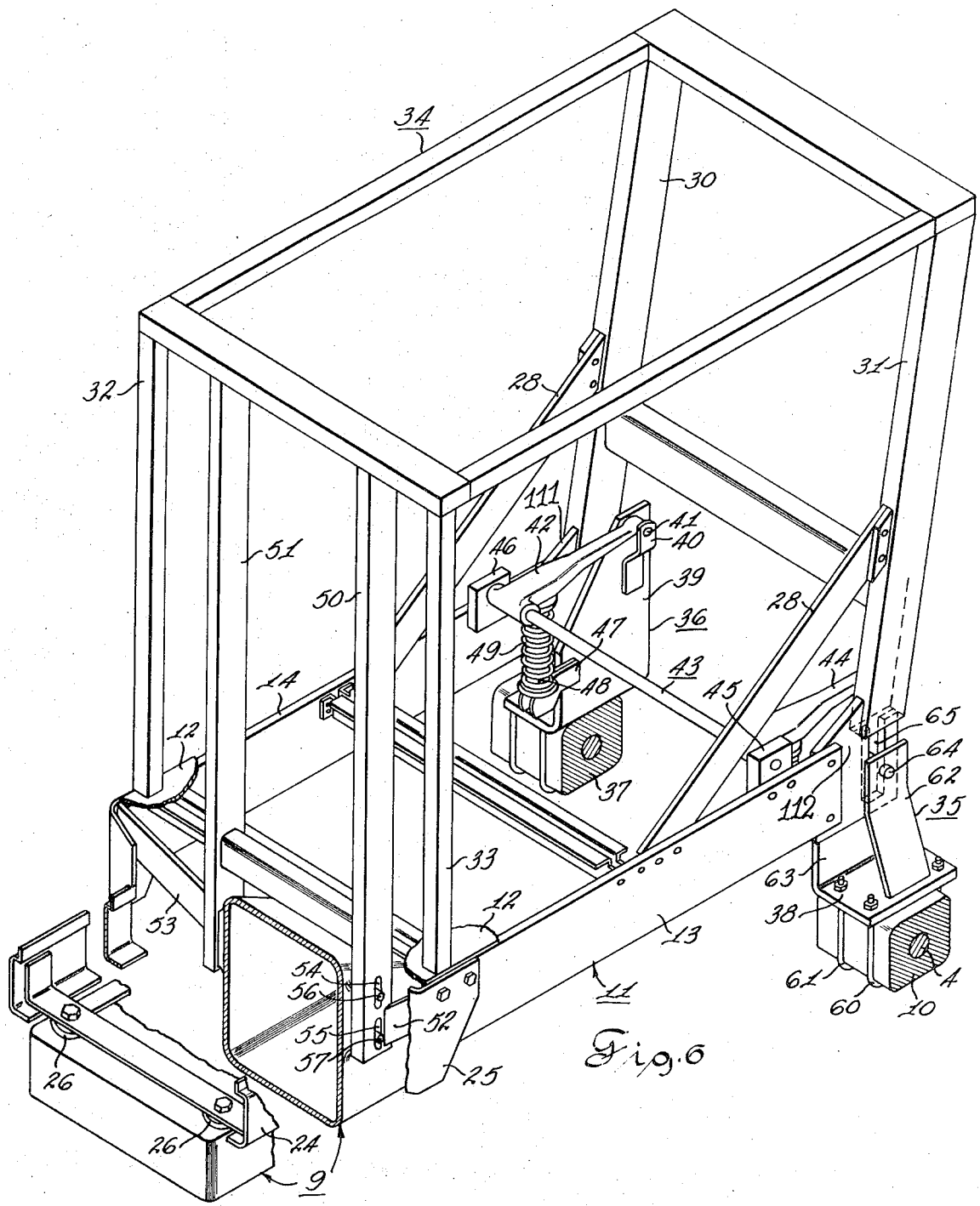

MOUNTING OF PROTECTIVE BARS ON MAIN FRAME

This invention relates to a safety device and more particularly to protective bars integral with a chassis carried on a suspension system mounted on the vehicle main frame whereby the protective bars form a lost motion locking device with the main frame to provide firm locking engagement with the main frame in event of roll over of the vehicle.

The conventional tractor was designed primarily for maximum power output and efficiency and limited attention was directed to the safety and convenience of the operator. Although recently more consideration has been given to the working conditions of the operator, the main improvement has been in the seat structure which provides a resilient mounting with possibly shock absorbers to minimize the vibration and shock transmitted from the main frame through the seat to the operator. Although this does provide a measure of improvement over some of the earlier designs, it does not provide an adequate degree of safety and comfort commensurate with the increased noise and vibration associated with the larger and more powerful vehicle presently manufactured.

According, a chassis of substantial mass defining the operator station mounted on a suspension system carried on the main frame provides a substantial improvement in ride, comfort, and control for the operator. The operator station for the operator of the vehicle may include a cab, together with the control levers, steering wheel, platform, and seat. A more detailed description and illustration of this type of a suspension system on a vehicle may be had by reference to the copending application, Ser. No. 144,451 of the same assignee.

The chassis as described for use on a vehicle of this type is resiliently supported on a suspension system mounted on the main frame. An added safety device of protective bars on a vehicle of this type may be incorporated in the cab or may be built in as protective bars per se for safety in event of upset of the vehicle. The resilience of the suspension system, however, permits movement of the chassis relative to the main frame. Since the protective bars are integral with the chassis, it is necessary that the protective bars be permitted to have a limited degree of movement relative to the main frame and yet it is also necessary that they become firmly engaged or locked with the main frame in event of vehicle upset. Accordingly, this invention provides a lost motion locking device which is formed by the protective bars and the main frame, and permits a degree of movement between the protective bars and the main frame to accommodate the relative movement permitted by the suspension system. As a limit of movement of the protective bars relative to the main frame is reached, the protective bars firmly lock with the main frame to provide protection for the operator.

Accordingly, it is an object of this invention to provide protective means mounted on a chassis supported on a suspension system on the main frame of the vehicle with a lost motion mechanism to accommodate movement of the chassis relative to the main frame by the suspension system.

It is another object of this invention to provide protective means integral with the chassis whereby the chassis is supported through a suspension system on the main frame for relative movement with the main frame. Lost motion and locking means on the main frame limit the movement of the protective means to lock the protective means in event of upset.

It is a further object of this invention to provide a main frame on a vehicle for supporting a suspension system carrying a chassis integral with protective means including a lost motion locking device limiting the movement of the protective means relative to the frame to thereby firmly lock the protective means with the main frame in event of upset.

The objects of this invention are accomplished by providing a suspension system on a vehicle main frame for supporting a chassis of substantial mass which defines an operator station. Integral with the structure on the chassis defining the operator station is protective means which moves with the chassis relative to the main frame. A lost motion device defined by the main frame and chassis permits limited movement of the protective means relative to the main frame to accommodate the resilient movement of the suspension system. At the limits of the movement of the lost motion device, the protective means is firmly locked with the main frame to provide a protective structure in event of vehicle upset.

The preferred embodiments of this invention are illustrated in the attached drawings.

FIG. 1 illustrates a side elevation view of the tractor with two of the wheels cut away to more clearly illustrate the relationship of the components of the vehicle.

FIG. 2 illustrates an enlarged fragmentary view of the suspension system illustrated in FIG. 1.

FIG. 3 is a cross section view taken on line III—III of FIG. 2.

FIG. 4 is an enlarged fragmentary view of a modification of the suspension system.

FIG. 5 is a cross section view taken on line V—V of FIG. 4.

FIG. 6 is a three dimensional view of a modification with portions of the tractor broken away to more clearly illustrate the protective means including uprights and overhead protection for the operator surrounding the operator station.

Referring to the drawings, FIG. 1 illustrates a vehicle including an engine 1 driving a transmission 2 connected to the rear end drive 3 for driving rear axles of which the left hand rear axle 4 is shown. The vehicle is supported on rear wheels 5 and front wheels 6. The front wheels 6 are rotatably mounted on a front axle 7 which is pivotally mounted on the bracket 8 of the main frame 9. For the purpose of description, the main frame 9 will be considered to include the structure of the engine, transmission, rear drive housing, and the rear axle sleeves 10 and 37.

Chassis 11 forms a platform 12 which is supported on side beams 13 and 14. The seat support 15 is mounted on a platform 12 and it supports the seat 16. The platform also supports the control panel 17 and the shroud 18, as well as the steering column 19 carrying steering wheel 20. The shroud 18 is connected to the engine hood 21. The side panels 22 and grill 23 are also carried on a pair of channels of which channel 24 is illustrated. Channel 24 is connected through the bracket 25 to the side beam 13. Similar structure is provided on the right side of the vehicle.

A chassis 11 is mounted on two rubber mounts 26 on the forward end of the vehicle. The rear end of the vehicle chassis is supported on a suspension system. The rear end of the chassis also supports the protective bars 126 and 27 which are held in an upright position by a pair of braces 28 on either side of the chassis.

The suspension system supporting the rear end of the chassis, as shown in FIG., 1 is similar to the suspension system, as shown in FIG. 6, which is a three dimensional view. The protective bars, as shown in FIG. 6, comprise the bars 30, 31, 32 and 33 which also support an overhead roof supporting structure 34. Bars 30 and 31 are connected to side beams 14 and 13 by gussets 111 and 112 respectively. The suspension system, however, as shown in FIG. 6, comprises a bracket 35 on the left hand drive shaft housing 10 and a similar bracket 36 on the right hand drive shaft housing 37. Brackets 36 and 35 on the right and left hand side of the chassis, as well as the protective means are symetrical. Referring to the bracket 35, a base 38 is fastened to the left hand drive shaft housing 10. The right hand bracket 36 has an upright portion 39 and an integral flange 40 which form a pin support for the pin 41. This construction is illustrated in FIG. 6. The pin 41 of bracket 36 pivotally connects the arm 42 which is integral with the torsion bar 43. The arm 44 is similarly connected to the bracket 35, as shown in FIGS. 2 and 3. The torsion bar 43 extends transversely across the chassis and is supported in the pillow blocks 45 and 46 which are each carried on the side beams 13 and 14 respectively.

Each of the brackets 35 and 36 also define forwardly extending portions 68 and 47 respectively. The portion 47 supports the shock absorber 48 and the coil spring 49 which embraces the shock absorber 48. The upper end of the shock absorber 48 pivotally engages the arm 42 of the torsion bar 43. The spring 49 is compressed in position between the arm 42 and the portion 47 of bracket 36 to support the right hand side of the chassis 11. The left hand side of the chassis is similarly supported.

At the forward end of the operator station a pair of uprights 50 and 51 are connected to the front end of the platform 12. These uprights extend downwardly to connect to side braces 52 and 53 which extend upward for connection to side beams 13 and 14. This portion of the chassis oscillates vertically at a slightly less amplitude than the rear end of the chassis. The lower end of the uprights 50 and 51 are formed with perforations 54 and 55 which receive pins 56 and 57 respectively. The pins 56 and 57 are mounted on suitable brackets on the side of the transmission housing. In event of roll over, the protective bars 32 and 33 are retained in a protective position since the uprights 50 and 51 cannot move any farther than the constrained movement allowed by the perforations 54 and 55 receiving the pins 56 and 57 and the similar lost motion means on the rear of the chassis. Accordingly, the front end of the operator station, as well as the rear end of the operator station cannot move beyond predetermined limits. This provides a locking relationship between the protective bars and the vehicle's main frame to assure protection of the operator in event of upset.

FIGS. 2 and 3 illustrate a more detailed view of the suspension system as shown in FIG. 1. It is understood that the two protective bar assembly, as shown in FIG. 1, might be used as well as the four protective bar assembly, as shown in FIG. 6. The four bar assembly adapts itself well to the use with a vehicle cab in that it provides a greater measure of protection in event of roll over. The protective bars would be adapted to the construction of the cab in order to provide the appearance and protection desired.

Referring to FIGS. 2 and 3, the left hand rear axle sleeve 10 is shown supporting the bracket 35 by means of plurality of U-bolts 60 and 61. The bracket 35 includes the uprights 62 and 63 which are in spaced relation to each other and receive the pin 64. The pin 64 slides within the slot 65 as the chassis 11 rides up and down relative to the bracket. The shock absorber 66 is embraced by the spring 67 and they are compressively positioned between the arm 44 and the portion 68 of the bracket 35. The shock absorber 66 is pivotally connected by means of a pin 69 in arm 44 and the pin 70 in the portion 68 of bracket 35. A flange 72 welded on the inboard side of the bracket 35 extends upwardly to support the arm 44 by means of a pin 73. As the chassis 11 moves up and down, the arm 44 pivots at the pin 73 of bracket 35, the spring 67 flexes while the shock absorber 66 dampens forces caused by vibration and shock from the main frame.

Transverse movement of the chassis is limited to a substantial degree by the arms 42 and 44 of the torsion bar 43 as they pivot on the brackets 36 and 35. The transverse movement of the chassis 11 is also confined by the protective bars 30 and 31 with brackets 36 and 35. Vertical movement is confined by the slots in gussets 111 and 112 receiving the pins mounted to brackets 36 and 35 and the length of the slot defines the limits of vertical movement of the chassis relative to the frame. Vibrations and shock transmitted rom the main frame 9 are dampened by the suspension system when the engine and transmission are in operation and the vehicle is traveling over rough terrain.

Referring to FIGS. 4 and 5, a modification of the suspension system shown in FIGS. 2 and 3 is illustrated. The bracket 75 consists of uprights 76 and 77. The bracket 75 is fastened by means of a plurality of U-bolts 78 and 79 to the rear axle sleeve 10. The portion 80 extends forwardly to pivotally support the shock absorber 81 by means of pin 82. The upper end of shock absorber 81 is connected by means of the pin 83 to the arm 44. The spring 84 is compressedly positioned between spring seats 85 and 186. The side beam 13 is bolted to the plate 87 by means of bolts 88. The plate 87 is welded to the protective bar 86.

The bracket 75 is formed with a plurality of pins 90, 91, 92, and 93 which support rollers 94, 95, 96 and 97 respectively. The positioning of the plate 87 between the uprights 76 and 77 confine the movement of the protective bar 86 upwardly and downwardly as plate 87 engages rollers 94 and 95 in its downward and upward movement respectively. The fore and aft movement is limited by the rollers 94 and 95, as well as rollers 96 and 97, engaging protective bar 86. The arm 44 of the torsion bar 43 operates in the same manner as that described in FIGS. 2 and 3.

The preferred embodiments of this invention have been illustrated and described, and its operation will be set forth in the following paragraphs.

The chassis 11 is mounted on rubber mounts 26 on its forward end to permit a pivoting movement in a substantially vertical plane as the chassis moves upwardly and downwardly on the suspension system on the rear end of the vehicle. The suspension system as previously described permits a degree of movement of the chassis to overcome shock and vibration which is normally transmitted from the main frame to the chassis. By constructing the chassis of substantial mass, the operator does not sense the roughness of terrain, since the chassis is spring suspended on the frame and the springs and shock absorbers dampen vibration and shock before it is transmitted to the seat 16.

Protective bars 30, 31, 32 and 33, as shown in FIG. 6, or the protective bars 126 and 27, as shown in FIG. 1, provide a protection for the operator in the operator station. This protection is primarily provided in event of upset of the vehicle although a measure of protection is also provided when the vehicle is in the upright position. Since the protective bars are integrally fastened to the chassis, it is understood that they move with the chassis and provide a feeling of security for the operator since the surrounding structure at the operator station moves with the operator. This is desirable for convenience and safety in operating the controls, such as the control levers and steering wheel. It is however, also necessary that the protective bars be firmly locked when any excessive force is imposed on the bars such as when the vehicle is upset. Under these conditions, the chassis will move to its limits of movement of the lost motion mechanism. The pin and slot mechanism are provided on the opposite sides of the chassis to permit movement of both sides of the chassis. The chassis moves to its extreme position where it firmly engages the frame and locks the protective bars to prevent any further relative movement between the bars and the main frame. This will provide the protection necessary in event of upset.

FIGS. 4 and 5 disclose the modification of this lost motion device wherein a plurality of rollers 94, 95, 96 and 97 confine the movement of the protective bar 86 and the plate 87 which are welded together. The degree of movement is confined by the space between the rollers 94, 95 as they engage the plate 87. The protective bar 86 slides upwardly and downwardly between rollers 94 and 97, as well as 95 and 96. The movement of the lost motion device is provided so that the chassis can move in accordance with the resilience in the suspension system and yet will lock firmly with the main frame in event of upset.

The embodiments of the invention in which an exclusive property or privilege is claimed are defined as follows:

1. A protective device for use on a vehicle comprising a vehicle main frame supported on a plurality of wheels, a chassis having substantial mass and defining an operator station, a suspension system mounted on said frame and resiliently supporting said chassis, protective bar means integral with said chassis, a lost motion locking means mounted on said main frame and connected to said chassis permitting lost motion between said protective bar means and said main frame including at least one movement limiting member on said chassis moving within limits relative to said main frame, at least one movement limiter on said main frame limiting movement of said movement limiting member relative to said main frame thereby locking said protective bar means to said main frame when said lost motion device moves to the limits of its movement.

2. A protective device for use on a vehicle as set forth in claim 1 wherein said lost motion locking means defines a slot on said chassis, a pin on said main frame for reception in said slot to permit relative movement between said chassis and said main frame.

3. A protective device for use on a vehicle as set forth in claim 1 wherein said main frame defines roller means, a bar integral with said chassis engaging said roller means for guiding and limiting movement of said chassis relative to said frame.

4. A protective device for use on a vehicle as set forth in claim 1 wherein said lost motion device includes a bracket on said main frame including a pair of uprights in spaced relation for supporting a pin, means defining a slot in said protective bars for receiving said pin to thereby limit relative movement of said chassis relative to said main frame by movement of said pin in said slot.

5. A protective device for use on a vehicle as set forth in claim 1 wherein said lost motion device includes at least one bracket on said main frame including a plurality of rollers supported on said bracket, protective bars integral with said chassis for reception intermediate said rollers, said rollers limiting the movement of said bar to thereby provide a locking of said chassis on said main frame when said lost motion device has reached its limits of movement.

6. A protective device for use on a vehicle as set forth in claim 1 wherein said suspension system includes a torsion bar having a pair of arms pivotally supported on said chassis, a pair of brackets mounted on said main frame, means defining a pivotal connection between said torsion bar arms and said brackets, means defining a pair of slots in said chassis, a pin on each of said brackets received in said slots to thereby provide a lost motion device between said chassis and said main frame.

7. A protective device for use on a vehicle as set forth in claim 1 wherein said suspension system includes a torsion bar pivotally mounted on said chassis and having a pair of arms, a pair of brackets mounted on said main frame, means defining a pivotal connection between said pair of arms and said torsion bar with said brackets, a plurality of rollers positioned in spaced relation on said brackets, a bar integral with said chassis receiving intermediate said rollers, said bar engaging said rollers which operate as abutments to limit the degree of movement of said lost motion device when said lost motion device permits said chassis to move to its limits of movement.

8. A protective device for use on a vehicle as set forth in claim 1 wherein said chassis includes a plurality of protective bars extending upwardly and over the operator station.

9. A protective device for use on a vehicle as set forth in claim 1 wherein said chassis includes a cab surrounding said operator station.

10. A protective device for use on a vehicle as set forth in claim 1 wherein said suspension system comprises shock absorbers, springs, and a sway bar to resiliently mount a chassis on the main frame and dampen shock transmitted from said main frame to said chassis and limit the sway and instability of the chassis relative to the main frame.

11. A protective device for use on a vehicle as set forth in claim 1 wherein said member defines an opening, said limiter includes means engaging said member thereby defining the upper and lower limits of movement of said member.

12. A protective device for use on a vehicle as set forth in claim 1 wherein said member defines an opening, said limiter includes means reciprocating in said opening and includes means engaging said member to define the upper and lower limits of movement of said member.

* * * * *